(12) United States Patent
Adams

(10) Patent No.: US 8,410,228 B2
(45) Date of Patent: Apr. 2, 2013

(54) EMULSION POLYMERISATION PROCESS

(75) Inventor: David Charles Adams, Darwen (GB)

(73) Assignee: Celanese International Corporation, Irving, TX (US)

(*) Notice: Subject to any disclaimer, the term of this patent is extended or adjusted under 35 U.S.C. 154(b) by 318 days.

(21) Appl. No.: 12/374,236

(22) PCT Filed: Jul. 16, 2007

(86) PCT No.: PCT/EP2007/057294
§ 371 (c)(1),
(2), (4) Date: May 27, 2009

(87) PCT Pub. No.: WO2008/009649
PCT Pub. Date: Jan. 24, 2008

(65) Prior Publication Data

US 2009/0306288 A1 Dec. 10, 2009

Related U.S. Application Data

(60) Provisional application No. 60/837,292, filed on Aug. 14, 2006.

(30) Foreign Application Priority Data

Jul. 18, 2006 (EP) .................................. 06117433

(51) Int. Cl.
*C08F 2/01* (2006.01)
*C08F 2/22* (2006.01)
(52) U.S. Cl. ........... 526/64; 524/800; 526/915; 422/132
(58) Field of Classification Search .................... 526/64, 526/915; 524/800; 422/132
See application file for complete search history.

(56) References Cited

U.S. PATENT DOCUMENTS

| | | | | |
|---|---|---|---|---|
| 5,969,065 A | * | 10/1999 | Jakob | 526/208 |
| 6,569,961 B1 | * | 5/2003 | Adams | 526/64 |
| 7,261,863 B2 | * | 8/2007 | Adams et al. | 422/132 |
| 7,858,715 B2 | * | 12/2010 | Adams | 526/64 |
| 7,897,115 B2 | * | 3/2011 | Adams | 422/132 |
| 2001/0022951 A1 | * | 9/2001 | Adams et al. | 422/132 |
| 2008/0221282 A1 | * | 9/2008 | Weismantel et al. | 526/64 |

FOREIGN PATENT DOCUMENTS

| | | | |
|---|---|---|---|
| DE | 2555874 | * | 6/1976 |
| EP | 0 417 893 | | 3/1991 |
| WO | WO 01/34293 | | 5/2001 |

OTHER PUBLICATIONS

"Lauryl mercaptan" data sheet. Obtained from chemicaland21.com. No Author, No date.*
English machine translation of DE 2555874 to Dargan. Translation obtained from EPO website on Mar. 17, 2011.*
International Search Report, PCT International Application No. PCT/EP2007/057294, dated Oct. 18, 2007.
International Preliminary Report on Patentability and Written Opinion, PCT International Application No. PCT/EP2007/057294, dated Oct. 24, 2008.

* cited by examiner

*Primary Examiner* — David W Wu
*Assistant Examiner* — Michael A Salvitti
(74) *Attorney, Agent, or Firm* — Roberts Mlotkowski Safran & Cole, P.C.

(57) ABSTRACT

An emulsion polymerization process using a redox initiator comprising a reductant and an oxidant, wherein monomers are mixed into a carrier liquid, e.g. water, to make a pre-emulsion, which is then supplied to a reactor comprising one or more circulation loops, an outlet, and a circulation pump for circulating a reactor charge within the circulation loop, characterized in that the reductant is added to the pre-emulsion before it is mixed into the reactor charge and the oxidant is mixed into the reactor charge, e.g., via the water-phase feed.

16 Claims, No Drawings

EMULSION POLYMERISATION PROCESS

REFERENCE TO RELATED APPPICATION(S)

This application is the U.S. National Phase of PCT/EP2007/057294 filed on Jun. 7, 2007 and claims the benefit of U.S. Provisional Application No. 60/837,292 filed on Aug. 14, 2006.

The present invention relates to an emulsion polymerisation process in a reactor comprising one or more circulation loops with one or more inlets for raw material, one or more outlets, and a circulation pump for circulating a reactor charge within the circulation loop. The polymerisation reaction is initiated by radicals to give a dispersion of high-molecular weight polymer particles suspended in a medium in which the polymer is insoluble, usually water. The obtained emulsion polymers are particularly useful as binders in emulsion paints, such as wall paints, or dispersion adhesives. Several types of initiators are used to initiate radical formation. Typical initiators are so-called redox initiators, comprising a reductant and an oxidant.

EP 0 417 893 A1 discloses an emulsion polymerisation process in a loop reactor. Water, monomers, and stabilisers are continuously fed to the loop and circulated and emulsion polymer is continuously drawn off. The monomers may be added neat or in a pre-emulsion. An oxidant is added to the flow containing monomer. In order to prevent premature polymerisation, a reductant is carried by a separate aqueous flow and fed into the reactor at a different point.

An undesirable feature encountered in these prior art polymerisation processes is grit formation, which is the formation of unwanted lumps of polymer during the manufacturing stage. These lumps most often are present as tiny beads of polymer of about 0.5 to 2 mm in diameter and must be filtered out of the product. High grit contents, e.g. above 0.4%, cause manufacturing difficulties because they slow the filter time and generate waste for disposal. Grit formation can be reduced by using high amounts of stabiliser. However, a high stabiliser content has the disadvantage of additional cost and most often is detrimental to application properties. Therefore, there is the general desire to use the lowest level of stabiliser consistent with achieving manufacturing and processing stability, acceptable levels of grit formation and application properties.

The object of the invention is to balance reduced grit formation with acceptably low stabiliser contents.

The object of the invention is achieved by an emulsion polymerisation process using a redox initiator comprising a reductant and an oxidant, wherein monomers are mixed into a carrier liquid to make a pre-emulsion, which is then supplied via a first feed line to a reactor comprising one or more circulation loops, an outlet, and a circulation pump for circulating a reactor charge within the circulation loop, characterised in that the reductant is added to the pre-emulsion separately from the oxidant and the oxidant is metered into the reactor charge via a second feed line.

Surprisingly, it was found that adding the reductant to the pre-emulsion instead of the oxidant resulted in much lower grit formation. Although premature polymerisation could have been expected, it did not take place.

The monomer pre-emulsions will generally have a monomer content of at least 10% by weight of the pre-emulsion, e.g. above 15 wt. % or above 20 wt. %

The oxidant can for example be added downstream or upstream of the inlet of the pre-emulsion, optionally pre-mixed with the aqueous carrier.

Optionally, the reductant is added to the monomer pre-emulsion as an aqueous solution comprising one or more stabilisers. The reductant can be dissolved in a small amount of water and fed into to the pre-emulsion feed line close to the point where it enters the loop reactor.

The risk of premature polymerisation can be further reduced by preparing the monomer pre-emulsion at ambient temperatures. Moreover, commercially available monomers generally comprise traces of inhibitors, such as hydroquinone or 4-methoxyphenol. Inhibitor in the monomers is consumed before polymerisation will commence.

Preferably, the pre-emulsion is made on-line, i.e. continuously and at the same rate as the feeding rate of monomer pre-emulsion into the reactor charge.

Some typical monomers suitable for use in the present polymerisation process include, e.g., ethylene, propylene, butylenes, acrylic acid, methacrylic acid, acrylate, methacrylate; alkyl acrylates, such as methyl acrylate, ethyl acrylate, butyl acrylate, and 2-ethyl hexyl acrylate; alkyl methacrylates, such as methyl methacrylate, ethyl methacrylate, and butyl methacrylate; styrene, vinyl formate, vinyl acetate, vinyl propionate and higher homologues of vinyl esters, vinyl chloride, and diallyl phthalate.

Commonly used oxidants are the salts of peroxodisulphuric acid, tert-butyl hydroperoxide, di-tert-amyl peroxide, tert-butyl peroxybenzoate, t-amyl hydroperoxide, and hydrogen peroxide itself. Suitable reductants are sodium sulphite, sodium metabisulphite, sodium formaldehyde sulphoxylate, ascorbic acid, and sodium dithionite. Transition metal salts, e.g. ferrous sulphate, can be used advantageously in trace quantities.

The monomer pre-emulsion can also comprise stabilisers. Suitable stabilisers are anionic and non-ionic surfactants, polymerisable stabilisers and surfactants, hydroxyethyl and hydroxymethyl cellulose and derivatives thereof, polyvinyl alcohols, polyvinyl pyrolidones, and surface-active water-soluble polyurethanes.

Agitation in the reactor can be provided by virtue of an in-line circulation pump. During the polymerisation reaction heat is generated. The temperature can be stabilised by cooling means, usually by controlled circulation of a cooling fluid (e.g. water) through a cooling jacket. Discharged emulsion polymer flows to the cooling tank, where residual monomer converts to polymer. After cooling, the emulsion polymer is filtered to remove any oversize particles or gritty material in the strainer and transferred to the product storage tank.

Optionally, the polymerisation process may be carried out under pressure, for instance under a pressure of 10 to 150 bar. Alternatively, the polymerisation may be carried out at ambient pressure.

The invention is further illustrated by the following examples. In the examples, amounts are given in percentages by weight of the complete formulation, unless indicated otherwise. Grit formation was evaluated by the following test method: emulsion polymer is poured onto a stainless steel sieve having a mesh size of 150 microns. By action of gravity the product slowly drains through the sieve but retains particulate matter generally larger than the sieve aperture size. The final trace of product is washed through with cold water and the retained particulates are washed with cold water, thereby concentrating the particulate matter. Excess water is removed from the grit before it is weighed. The weight of the grit is then expressed as g per kilo of emulsion filtered.

COMPARATIVE EXAMPLE 1A

An emulsion polymer was made using the conventional format for monomer delivery, i.e. neat monomer containing t-butyl hydroperoxide metered directly into the loop. The water phase contained a mixture of two partially hydrolysed polyvinyl alcohols totalling 2.0% on product, 0.2% of an anionic surfactant, pH modifier, sodium metabisulphite, and water.

The formulation was set to a nominal solids content of 47%. The reaction conditions were as follows, temperature 80° C., pressure 2 bar, production rate 162 ml/minute, recycle to feed ratio 105, mean residence time 8 minutes, mean flow path velocity 0.7 m/s, mean shear rate 350 reciprocal seconds.

The product made in this manner was found to be 47.7% in solids content and had a grit content of 2.3 g per kilogram of product.

EXAMPLE 1B

A formulation identical to the formulation used in Comparative Example 1A was prepared, except that first a pre-emulsion comprising the monomers, stabilisers, pH modifier, and sodium metabisulphite was made. The pre-emulsion was fed into the reactor charge. A second feed consisted only of tert-butyl hydro-peroxide and 19% of the available water. The resultant reaction gave a solids content of 47.2% and a grit content of 0.07 g per kilogram of product.

COMPARATIVE EXAMPLE 2A

An emulsion polymer was made using the conventional format for monomer delivery, i.e. neat monomer containing t-butyl hydroperoxide metered directly into the loop. The water phase contained 0.3% of an allyl modified hydroxyethyl cellulose, 1.5% of an anionic surfactant, and 0.2% of a polymerisable stabiliser. In addition, a pH modifier, sodium metabisulphite, and water were present.

The formulation was set to a nominal solids content of 55%. The reaction conditions were as follows, temperature 60° C., pressure 2 bar, production rate 175 ml/minute, recycle to feed ratio 76, mean residence time 7.4 minutes, mean flow path velocity 0.56 m/s, mean shear rate 275 reciprocal seconds.

The product made in this manner was found to be 54.5% in solids content and had a grit content of 13.4 g per kilogram of product.

EXAMPLE 2B

A formulation identical to the formulation used in Comparative Example 2A was prepared, except that first a pre-emulsion comprising the monomers, stabilisers, pH modifier, and sodium metabisulphite was prepared. The second feed consisted only of tert-butyl hydroperoxide, the polymerisable stabiliser, and 36% of the available water. The resultant reaction gave a solids content of 55.3% and a grit content of 0.5 g per kilogram of product.

COMPARATIVE EXAMPLE 3A

An emulsion polymer was made using the conventional format for monomer delivery, i.e. neat monomer containing t-butyl hydroperoxide and t-butyl peroxy-benzoate metered directly into the loop. The water phase contained 0.5% of a hydroxyethyl cellulose, 1.0% of a non-ionic surfactant, 0.5% of an anionic surfactant. In addition, a pH modifier, sodium metabisulphite, sodium formaldehyde sulphoxylate, and water were present.

The formulation was set to a nominal solids content of 55%. The reaction conditions were as follows, temperature 60° C., pressure 2 bar, production rate 117 ml/minute, recycle to feed ratio 114, mean residence time 9.0 minutes, mean flow path velocity 0.56 m/s, mean shear rate 275 reciprocal seconds. The product made in this manner was found to be 56.3% in solids content and had a grit content of 0.6 g per kilogram of product.

COMPARATIVE EXAMPLE 3B

A formulation identical to the formulation used in Comparative Example 3A was prepared, except that first a pre-emulsion was prepared comprising all the stabilisers except 0.1% anionic surfactant, pH modifier, and oxidants. The second feed consisted of the reductants and 0.1% anionic surfactant and 25% of the available water. The resultant reaction gave a solids content of 54.6% and a grit content of 1.9 g per kilogram of product

EXAMPLE 3C

A formulation identical to the formulation used in Comparative Example 3B was prepared, except that the pre-emulsion was prepared comprising the monomers and stabilisers except 0.1% anionic surfactant, pH modifier, and reductants. The second feed consisted of the oxidants, 0.1% anionic surfactant, and 25% of the available water. The resultant reaction gave a solids content of 53.1 % and a grit content of 0.3 g per kilogram of product.

The invention claimed is:

1. An emulsion polymerization process using a redox initiator comprising a reductant and an oxidant, the process comprising:
   mixing monomers into a carrier liquid to make a pre-emulsion having a monomer content of at least 10% by weight of the pre-emulsion;
   supplying the pre-emulsion via a first feed line to a reactor comprising one or more circulation loops, an outlet, and a circulation pump for circulating a reactor charge within the circulation loop;
   adding the reductant to the pre-emulsion instead of the oxidant via the first feed line to the reactor; and
   separately metering the oxidant into the reactor charge via a second feed line entering the circulation loop.

2. The process according to claim 1, wherein the pre-emulsion has a monomer content of at least 15% by total weight of the pre-emulsion.

3. The process according to claim 1, wherein the oxidant is added downstream of said first feed line.

4. The process according to claim 1, wherein the reductant is added as an aqueous solution comprising one or more stabilizers.

5. The process according to claim 1, wherein the reductant is added to the pre-emulsion before the pre-emulsion enters the reactor.

6. The process according to claim 2, wherein the oxidant is added downstream of said first feed line.

7. The process according to claim 2, wherein the reductant is added as an aqueous solution comprising one or more stabilizers.

8. The process according to claim 3, wherein the reductant is added as an aqueous solution comprising one or more stabilizers.

9. The process according to claim 6, wherein the reductant is added as an aqueous solution comprising one or more stabilizers.

10. The process according to claim 2, wherein the reductant is added to the pre-emulsion before the pre-emulsion enters the reactor.

11. The process according to claim 3, wherein the reductant is added to the pre-emulsion before the pre-emulsion enters the reactor.

12. The process according to claim 4, wherein the reductant is added to the pre-emulsion before the pre-emulsion enters the reactor.

13. The process according to claim 6, wherein the reductant is added to the pre-emulsion before the pre-emulsion enters the reactor.

14. The process according to claim 7, wherein the reductant is added to the pre-emulsion before the pre-emulsion enters the reactor.

15. The process according to claim 8, wherein the reductant is added to the pre-emulsion before the pre-emulsion enters the reactor.

16. The process according to claim 9, wherein the reductant is added to the pre-emulsion before the pre-emulsion enters the reactor.

* * * * *